Feb. 28, 1950 — L. B. COURTOT — 2,499,056
TOOL FOR ASSEMBLING INSERTS IN HOSE ENDS
Filed Nov. 9, 1946
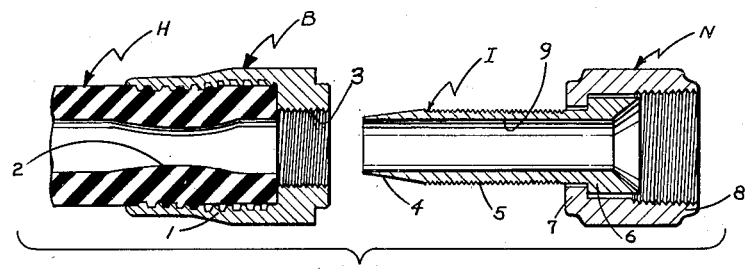
Fig. 1
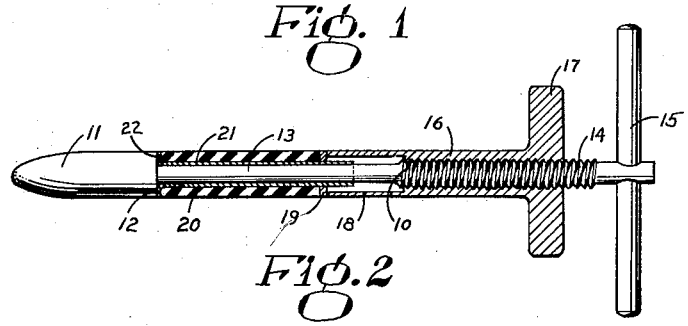
Fig. 2
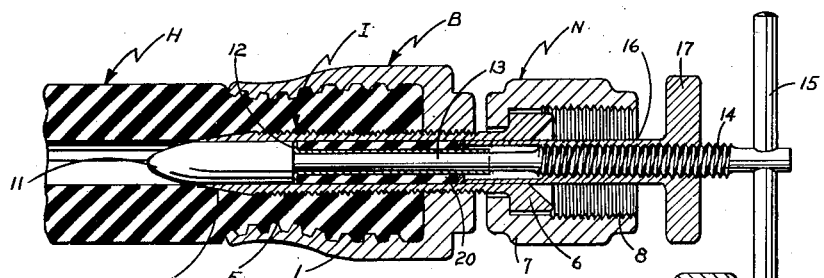
Fig. 3
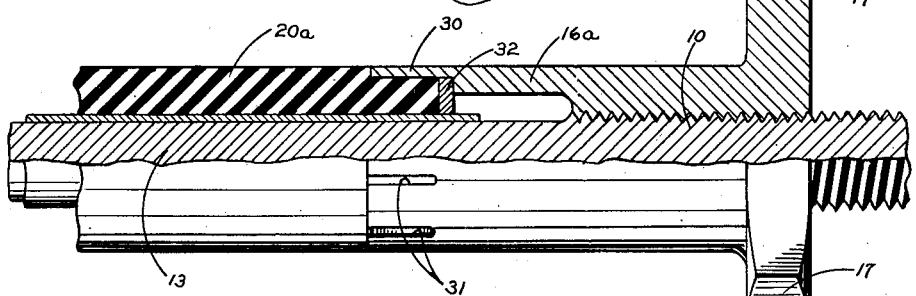
Fig. 4
INVENTOR.
LOUIS B. COURTOT
BY 
ATTORNEYS Patented Feb. 28, 1950

2,499,056

UNITED STATES PATENT OFFICE 2,499,056

TOOL FOR ASSEMBLING INSERTS IN HOSE ENDS

Louis B. Courtot, Cleveland, Ohio, assignor to The Weatherhead Company, Cleveland, Ohio, a corporation of Ohio Application November 9, 1946, Serial No. 708,891

3 Claims. (Cl. 81—72)

1

This invention relates to a tool for assembling a hose end fitting with a hose end for a flexible hose.

In certain types of hose end fittings a hose insert or nipple must be inserted into the bore of a hose which has been positioned in a hose end part. Customarily, there is very little on the hose insert which enables the assembler to obtain a firm grip thereon and, in fact, the insert usually carries an independently rotatable nut or collar member, which makes it difficult to apply any torque to the insert to thread it to the hose end.

It is an object of this invention to provide a tool which grips the insert firmly, enabling the same to be manipulated and threaded into the hose end fitting. Such a hose end assembly offers a comparatively large amount of frictional resistance to the assembly of an insert within the hose end.

It is another object of this invention to provide a tool in which the gripping action of the tool upon the insert is increased as the resistance to entry of the insert increases, thereby insuring that the tool will not slip in the insert during assembly.

A further object of this invention is in the provision of a tool which will not mar or distort any part of the fitting.

These and other objects will be apparent as the following detailed description of my invention proceeds.

In the drawings:

Fig. 1 shows the body fitting part crimped to the hose before the hose insert is assembled with the hose end;

Fig. 2 shows a preferred embodiment of my novel tool;

Fig. 3 shows my tool functioning to assemble a hose insert in the hose end; and

Fig. 4 shows a modified form of tool.

One style of hose end fitting, for which my tool is particularly adapted, includes a body or sleeve member B which is usually positioned about the hose H. The body member has a sleeve portion I which is deformed or corrugated by a crimping operation prior to the hose coupling operation so that a hose section 2 of reduced diameter is formed, it being necessary to force the hose insert through this portion during the assembly operation. The end of the body may be threaded as at 3 to receive mating threads 5 formed on the hose insert I. The nose of the insert is generally tapered as at 4 to facilitate its introduction into the hose. The outer end of the insert has a shouldered portion 6 which retains a nut N by means of a mating shoulder 7 on the nut. Nut N may be threaded as at 8 for cooperation with the associated fitting.

The tool T shown in Fig. 2 is mounted to firmly grip the hose insert and nut assembly during assembly of these parts with the hose and fitting body. The tool has a central member indicated generally at 10 formed with a tapered pilot nose portion 11. The pilot nose has a rearward generally radial shoulder 12 connecting with a stem portion 13 which is integral with a threaded stem 14. A handle 15 is provided for the member 10. I prefer that the hand of the threads be opposite to that of the threads 3 and 5 on the fitting. For example, with the conventional right-hand fitting threads, the threads 14 will be left-hand threads for reasons to be hereinafter fully described. A sleeve portion 16 is threaded to the portion 14 of the tool and is provided with a manipulating knob or grip member 17. The sleeve may have an unthreaded extension 18 which engages a washer 19 slidably mounted on the stem 13. A sleeve 21 rotatably mounted on the stem 13 is provided, the sleeve having a radial wall 22. The tool is completed by the resilient rubber-like sleeve 20 which rests between the radial walls formed by wall 22 of the sleeve 21 and the washer 19 that engages the outer tool member.

In operation, the tool is slipped into the bore 9 of the hose insert I, so that the rubber member 20 rests within the bore of the insert and the pilot nose 11 projects outwardly therefrom. Then grip member 17 and handle 15 are grasped and rotated relative to one another, the result being that the recess containing the rubber member 20 is shortened axially. For example, if the threads 3 and 5 are right-handed, the threads 14 will be left-handed, and the desired gripping action can be obtained by holding grip 17 and turning handle 15 to the right. This causes nose 11 and the sleeve 16 to approach one another causing the rubber sleeve 20 to be expanded tightly against the bore 9 of the hose insert. As the insert I is threaded into the body B by means of the handle 15, the resistance to insertion of the insert, caused by the reduced section 2 of the hose, tends to hold the insert and hence rubber member 20 from rotation. When this happens, a torque on the handle tends to move stem 10 to the right relative to the rubber sleeve 20 and since threads 14 are left-handed threads, this causes the stem 10 to advance to the right in the figure, axially shortening the recess for the rubber and increasing pressure of the rubber against the hose insert. Since the area of contact between rubber sleeve 20 and the hose insert is greater than between the rubber member and stem 13, the above described self-tightening action will occur. Thus, my novel tool is automatically self-tightening and if properly inserted initially there will be no tendency of the tool to slip within the insert during the assembly operation.

The modified form shown in Fig. 4 is basically like that previously described and includes the inner tool member 10 having a stem 13 which is surrounded by rubber sleeve 20a. However, the sleeve member 16a is modified to provide a series of thin axial fingers 30. These may be formed by reducing the wall thickness of the end of the sleeve and cutting slots 31 therein as indicated. The washer 32 is provided to provide a wall for the end of the rubber sleeve 20a in order that it may be axially compressed. The modified tool functions like that previously described, the only difference being that as the metal parts 10 and 16a are rotated relative to one another so as to shorten the recess containing the rubber sleeve, the metal fingers 30 are urged radially outwardly against the bore 9 of the hose insert by the rubber member. This makes the self-locking action described previously more positive in that sleeve member 16a is firmly held against rotation relative to the insert. Thus, if increased resistance is encountered, stem member 10 is certain to rotate relative to the sleeve member and cause further expansion of the rubber sleeve 20a against the hose insert as described previously.

Although I have shown washers 19 and 32 as forming one wall for the rubber sleeve, this structure is merely to facilitate manufacture and I contemplate that these washers could be dispensed with or could be formed as integral parts of the metal sleeve member of the tool. Various design details may be modified in accordance with machine design practice without departing from the essence of my invention which provides an axially compressible rubber-like gripping member to firmly grip the hose insert during assembly with threaded engagement between the tool parts such that the gripping action is automatically augmented as resistance to advance of the insert in the hose increases.

Although I have described a preferred embodiment, I contemplate that the claims and not that embodiment be determinative of the scope of my invention.

What is claimed is:

1. A tool for assembling a hose insert into a hose end comprising a first member having a nose portion, an intermediate portion of reduced section, a threaded portion and a grip, a sleeve member threaded to the first member and having a grip and an end portion axially spaced from said nose portion, whereby said nose portion, intermediate portion of reduced section and the end of said sleeve member form an axially shortenable annular recess, the end portion of said sleeve having a plurality of flexible fingers, and a rubber-like member in said recess and underlying said fingers for gripping the hose insert upon relative motion of said members.

2. A tool for threading a threaded hose insert into a hose end assembly comprising a first member having a nose portion with rearwardly-facing shoulder means, an intermediate portion of reduced section, a uniformly threaded portion and a grip, a sleeve member threaded to the first member, said sleeve member having a grip and a forwardly-facing shoulder means spaced axially rearwardly of said nose portion shoulder means, whereby said nose portion shoulder means, intermediate portion of reduced section, and the shoulder means of said sleeve member form an axially shortenable annular recess, and a rubber-like member in said recess and engaging said shoulder means, said nose portion and rubber-like member being insertable in the hose insert, said first member being threaded oppositely to the hose insert whereby resistance to threading the insert into the fitting body causes axial compression of the rubber-like member to firmly grip the hose insert.

3. A tool for threading a threaded hose insert into a hose end assembly comprising a first member having a nose portion with rearwardly-facing shoulder means, an intermediate portion of reduced section, a uniformly threaded portion and a grip, a sleeve member threaded to the first member, said sleeve member having a grip, forwardly-facing shoulder means spaced axially rearwardly of said nose portion shoulder means, and a plurality of flexible fingers, whereby said nose portion shoulder means, intermediate portion of reduced section, and the shoulder means of said sleeve member form an axially shortenable annular recess, and a rubber-like member in said recess, engaging said shoulder means, and underlying said fingers, said nose portion and rubber-like member being insertable in the hose insert, said first member being threaded oppositely to the hose insert whereby resistance to threading the insert into the fitting body causes axial compression of the rubber-like member to firmly grip the hose insert.

LOUIS B. COURTOT.

REFERENCES CITED

The following references are of record in the file of this patent:

UNITED STATES PATENTS

| Number | Name | Date |
| --- | --- | --- |
| 163,217 | Lawson | May 11, 1875 |
| 188,625 | Hand | Mar. 20, 1877 |
| 1,765,864 | Corey | June 24, 1930 |
| 1,794,369 | Edgar | Mar. 3, 1931 |
| 1,997,878 | Wagner | Apr. 16, 1935 |